Patented Apr. 1, 1924.

1,488,918

UNITED STATES PATENT OFFICE.

VALENTINE HECHLER, OF CHICAGO, ILLINOIS, ASSIGNOR TO WILSON & COMPANY, OF CHICAGO, ILLINOIS, A CORPORATION OF NEW YORK.

OLEO OIL.

No Drawing.   Application filed May 4, 1921. Serial No. 466,740.

*To all whom it may concern:*

Be it known that I, VALENTINE HECHLER, a citizen of the United States, residing at 4100 So. Ashland Avenue, Chicago, in the county of Cook and State of Illinois, have invented new and useful Improvements in Oleo Oil, of which the following is a specification.

The present invention relates to a new article of manufacture and will be fully understood from the following description thereof.

Oleo oil, as known in commerce, is a fat expressed from beef or mutton fat. On cooling below its melting point, which varies from 78 to 95° F. it becomes hard and of a coarse granular texture and the hardened product is not homogeneous or uniform in character. On again heating or warming the hardened oleo oil it tends to liquate and to soften or melt in proximity to the walls of the container to which the melting heat is applied, leaving a hard mass of the oil in the center of the container. The hardness and uneven melting of oleo oil in the form hitherto known have rendered its use impracticable for many purposes and particularly in the baking industry. If used in the baker's art, particularly in pastry manufacture, it forms lumps which do not become uniformly distributed through the mass of dough during kneading with the result that on rolling the dough the lumps of fat are rolled out to a considerable size and spoil those portions of the dough where they are found. These disadvantages of oleo oil have therefore prevented its use in the baker's industry, notwithstanding the fact that its fatty constituents are such as to render it a very desirable shortening.

In accordance with the present invention oleo oil, substantially water free, is produced in a plastic, homogeneous fine-grained, form, which does not loose these characteristics on cooling and which on subsequent warming retains its uniformity and plasticity and its fine-grained texture, and does not tend to melt superficially, leaving a center or core of hardened fat, as is the case in the form in which oleo oil has hitherto been known. In order to produce oleo oil in the new form in accordance with my invention it is subjected to the following treatment.

The oleo oil is heated until completely melted. It is then cooled very slowly to below its hardening point while being vigorously agitated, kneeded or mixed by paddles or rolls during the cooling. The rate of cooling from a few degrees above the point at which hardening begins to below its hardening point should be very slow, for example, a period of 45 minutes to one and one half hours should be employed. After the oil has been brought below its hardening point in this manner it may be placed in trade packages or may be cooled to any desired temperature without affecting its fine-grained texture or homogeneity, and on again warming it, it does not melt unevenly nor lose its plasticity or homogeneity until completely melted. It is distinctly lighter in color than the form of oleo oil hitherto known. In this form it may be mixed uniformly in doughs and may consequently be advantageously employed by bakers.

It is realized that a small proportion of stearin or other high melting point fat may be added to the oleo oil to raise its melting point and render it more suitable for use in warmer climates and seasons. Such an addition does not, however, alter the character of the oil from the standpoint of this invention.

I claim:

As a new article of manufacture, substantially water free oleo oil having a smooth fine-grained texture and uniform and homogeneous in character.

VALENTINE HECHLER.